United States Patent
Park et al.

(10) Patent No.: US 7,239,942 B2
(45) Date of Patent: Jul. 3, 2007

(54) CRADLE FOR ON-VEHICLE NAVIGATION SYSTEM

(75) Inventors: In-Ho Park, Yongin-si (KR); Gyoo-Hong Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 615 days.

(21) Appl. No.: 10/833,755

(22) Filed: Apr. 28, 2004

(65) Prior Publication Data

US 2005/0085952 A1    Apr. 21, 2005

(30) Foreign Application Priority Data

Oct. 20, 2003    (KR) .................... 10-2003-0073183

(51) Int. Cl.
F16M 13/00    (2006.01)
F16M 11/14    (2006.01)
B60R 11/02    (2006.01)

(52) U.S. Cl. .................. 701/1; 248/671; 248/288.31

(58) Field of Classification Search .................. None
See application file for complete search history.

(56) References Cited

U.S. PATENT DOCUMENTS 5,845,885 A * 12/1998 Carnevali ................ 248/181.1
6,397,046 B1 * 5/2002 Kfoury .................... 455/90.1
6,427,115 B1 * 7/2002 Sekiyama ................ 701/208
6,663,064 B1 * 12/2003 Minelli et al. ........... 248/205.5
6,816,783 B2 * 11/2004 Hashima et al. ......... 701/209
6,840,487 B2 * 1/2005 Carnevali ............. 248/346.06

FOREIGN PATENT DOCUMENTS

EP    04477152 A2 * 9/1991

* cited by examiner

Primary Examiner—Michael J. Zanelli
(74) Attorney, Agent, or Firm—The Farrell Law Firm

(57) ABSTRACT

A cradle for an on-vehicle navigation system using a portable terminal includes directional sensors, such as a gyro-sensor and an acceleration sensor, and a plate-shaped fixing unit for fixing the on-vehicle navigation system onto a desired surface inside a vehicle. The cradle further includes a support extending upwardly from the fixing unit, a fastening unit rotatably positioned on the support and receiving the portable terminal thereon, and a sensor unit rotatably coupled to the support and provided with a leveler in its uppermost end.

7 Claims, 6 Drawing Sheets

CRADLE FOR ON-VEHICLE NAVIGATION SYSTEM

PRIORITY

This application claims priority under 35 U.S.C. § 119 to an application entitled "Cradle For On-vehicle Navigation System" filed in the Korean Intellectual Property Office on Oct. 20, 2003 and assigned Serial No. 2003-73183, the contents of which are incorporated herein by reference.

BACKGROUND OF THE INVENTION

1. Field of the Invention

The present invention relates generally to an on-vehicle navigation system using a portable terminal and, in particular, to a cradle for use in such an on-vehicle navigation system.

2. Description of the Related Art

An on-vehicle navigation system is conventionally utilized to provide a variety of traffic information such as geographical information or highway traffic situation required for driving a vehicle in a most efficient manner. Most of those on-vehicle navigation systems are originally installed at some expensive automobiles during their assembly at the automobile factory, or otherwise they may be later installed by automobile accessory shops upon the automobile's delivery from a manufacturer if required by the user.

These on-vehicle navigation systems each include a directional sensor such as a gyro-sensor, acceleration sensor, etc. and a global positioning system (GPS) provided within the vehicle to detect an angle of rotation, velocity or acceleration on a real-time basis during movement of the vehicle, so as to compute a distance of movement of the vehicle or keep track of its position.

However, while those originally installed on-vehicle navigation systems could be used by the users immediately upon the vehicle's delivery, a market product navigation system separately installed by automobile accessory shops and most likely usable in association with a portable telephone terminal should include at least a cradle for fixing the portable terminal, gyro-sensor and acceleration sensor. Such an arrangement may often cause a significant inconvenience to its users upon installation of those navigation systems. Furthermore, for a normal operation of a directional sensor, such as the gyro-sensor, acceleration sensor and so on, its position and installation topology should be kept in a substantially horizontal direction. To meet this requirement, a control unit of the on-vehicle navigational system frequently has been installed within a trunk of the automobile or, in some applications, below a seat assembly, thereby causing inconvenience during its service and/or installation for the user.

SUMMARY OF THE INVENTION

It is, therefore, an object of the present invention to provide an improved cradle for an on-vehicle navigation system using a portable terminal which is configured to facilitate installation of directional sensors, such as a gyro-sensor and acceleration sensor, with ease and convenience to its user.

Accordingly, to achieve the above and other objects of the present invention, the cradle for an on-vehicle navigation system using a portable terminal includes: a fixing unit for fixing the on-vehicle navigation system in the desired location inside a vehicle, the fixing unit having a given area of a plate shape; a support extending upwardly from the fixing unit; a fastening unit rotatably positioned on the support for fastening the portable terminal thereon; and a sensor unit rotatably coupled to the support and provided with a leveler in its uppermost end.

Preferably, the fastening unit comprises a holder for accommodation of the portable terminal in the front end of the fastening unit, a speaker set installed in a vicinity of one end of the holder, and at least one key button arranged in the other end of the holder.

Preferably, the sensor unit may be configured to accommodate a gyro-sensor and an acceleration sensor therein.

More preferably, the sensor unit comprises a housing having an opening in its uppermost end, the opening having a shape of hemisphere with the largest depth in its central area, a ball movably accommodated within the opening, and a cover made of transparent material and adapted to completely close the uppermost surface of the opening.

Preferably, an annular limiting line may be formed on the bottommost surface of the opening for defining the permissible limit of the ball's movement so as to indicate the alignment status in the vertical direction of the housing.

Furthermore, the fixing unit may be secured onto a dashboard inside the vehicle.

BRIEF DESCRIPTION OF THE DRAWINGS

The foregoing and other features and advantages of the invention will be apparent from the following detailed description of preferred embodiments as illustrated in the accompanying drawings, wherein same reference characters refer to the same parts or components throughout the various views. The drawings are not necessarily to scale, but the emphasis instead is placed upon illustrating the principles of the invention, wherein.

DETAILED DESCRIPTION OF THE PREFERRED EMBODIMENT

In the following description, for purposes of explanation rather than limitation, specific details, such as the particular architecture, interfaces, techniques, etc., are set forth in order to provide a thorough understanding of the present invention. However, it will be apparent to those skilled in the art that the present invention may be practiced in other embodiments, which depart from these specific details. For the purpose of simplicity and clarity, detailed descriptions of well-known devices and methods are omitted so as not to obscure the description of the present invention with unnecessary detail.

Figure 1:
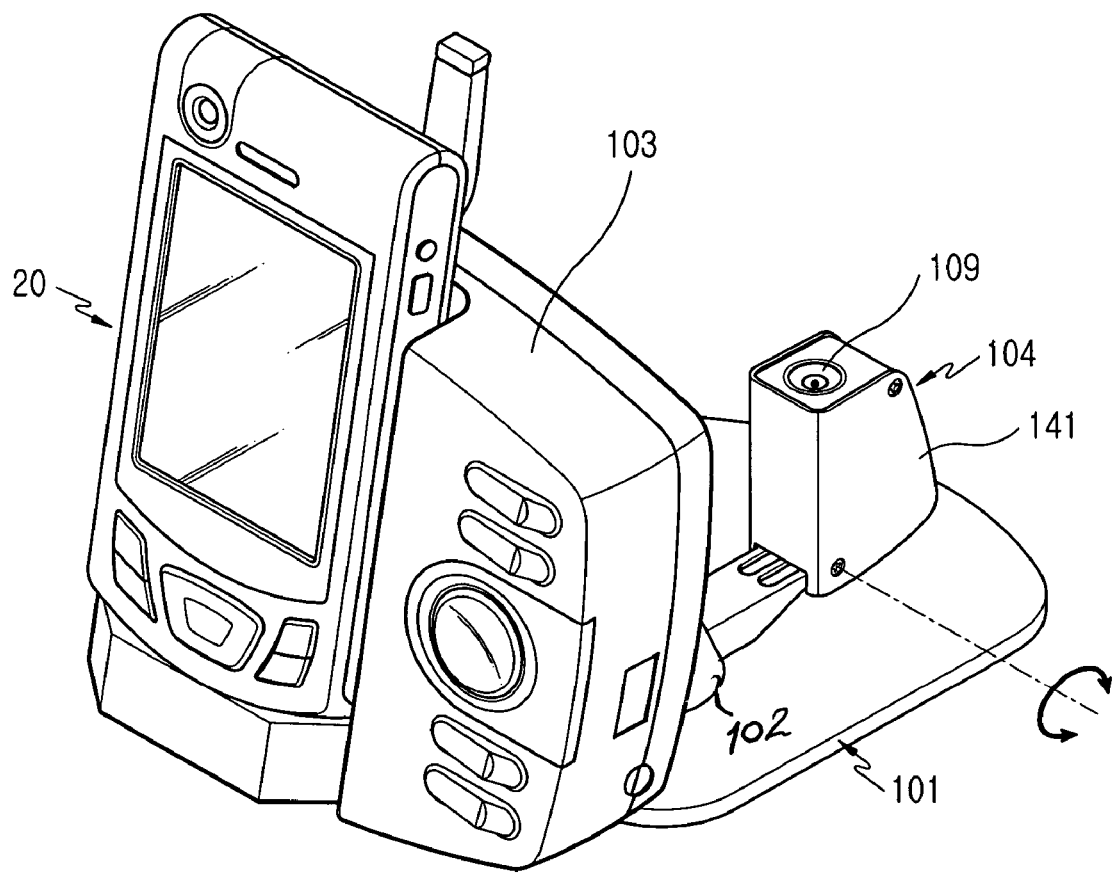
FIG. 1 shows a perspective view of a cradle for an on-vehicle navigation system according to a preferred embodiment of the present invention.

Referring now to FIG. 1, description is made to a cradle 100 for an on-vehicle navigation system according to a preferred embodiment of the present invention. As seen in the drawing of FIG. 1, the cradle 100 for the on-vehicle navigation system includes a fixing unit 101, a support 102 (better seen in FIG. 3), a fastening unit 103 and a sensor 104.

Figure 3:
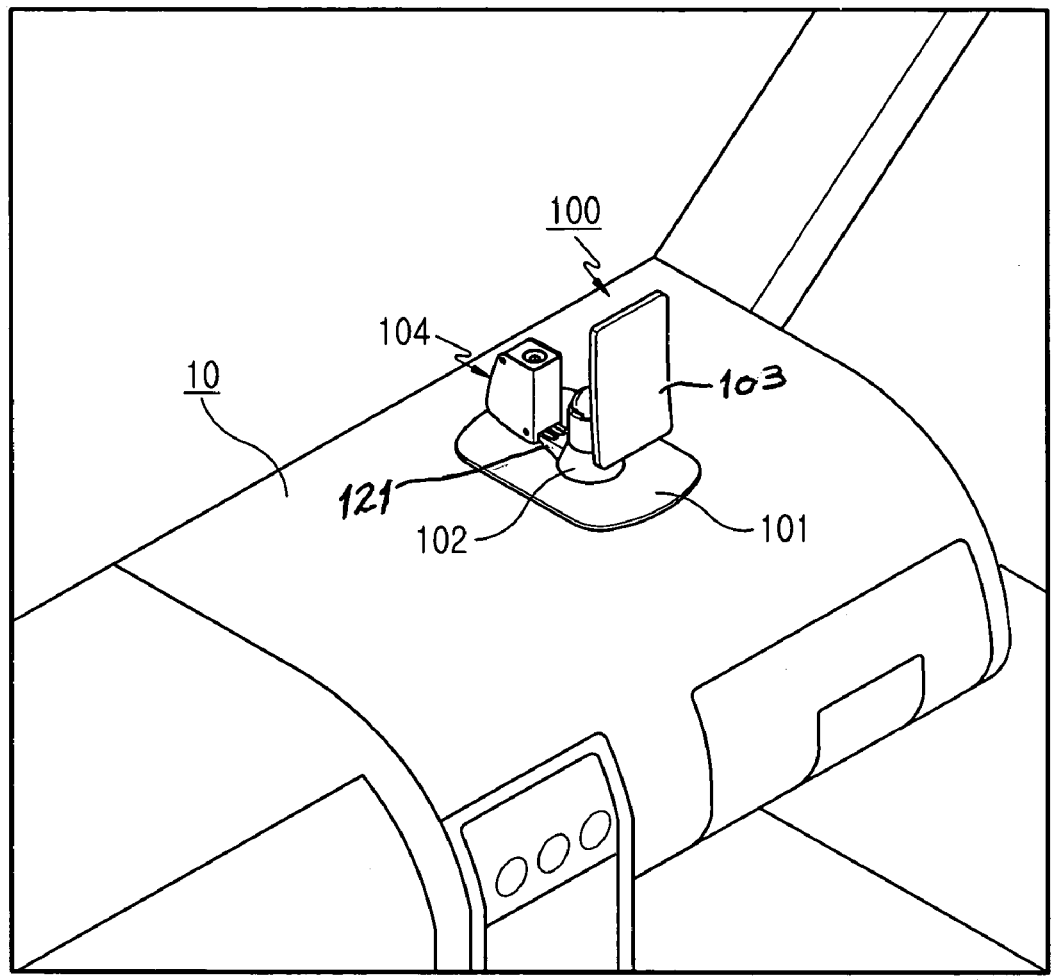
FIG. 3 schematically illustrates configuration of the cradle positioned on a dashboard of the vehicle.

The fixing unit 101 is positioned in the bottommost end section of the cradle assembly 100 for securing the latter onto the desired surface, e.g., a dashboard, in vicinity of the driver's seat of the vehicle, as shown in FIG. 3. Preferably, the fixing unit 101 is formed of a flat plate with an adequate area for its attachment onto any underlying surface and may be made of flexible synthetic resins or plastics so as to have a shape conforming to the dashboard or any other interior parts of the vehicle. Further, the fixing unit 101 is generally provided with an adhesive means on its bottom surface for adhering this unit to a given surface e.g. the dashboard 10 (FIG. 3). Alternatively, the unit may be provided with screws (not shown) for fixing it to the dashboard.

In a preferred embodiment, the fixing unit 101 may be extruded or molded from flexible materials, such as synthetic resins or plastics, or from any metal alloys, such as copper alloy, which are capable of plastically deforming at an ambient temperature so as to conform to different profiles of the dashboard of each vehicle and engage the dashboard's top surface. Further, it will be well understood that in case where the fixing unit 101 is to be fixed to the dashboard 10 by means of a fixing means such as screws, the metal alloy would provide stronger fixation than the synthetic resins as material suitable for manufacturing the fixing unit 101. Furthermore, if the fixing unit 101 is made from metallic material, such as copper alloy, it may be coated with synthetic resins or plastics in its outer surface.

The support 102 (FIGS. 1, 3) is configured to extend upwardly from the top surface of the fixing unit 101, and the fastening unit 103 is fixedly coupled to the top end of the support 102. The support 102 is provided with a supporting arm 121 (FIGS. 3, 4) that is configured to extend outwardly from the peripheral outer surface of the support facing a section of the fixing unit 101.

Figures 2A, 2B:
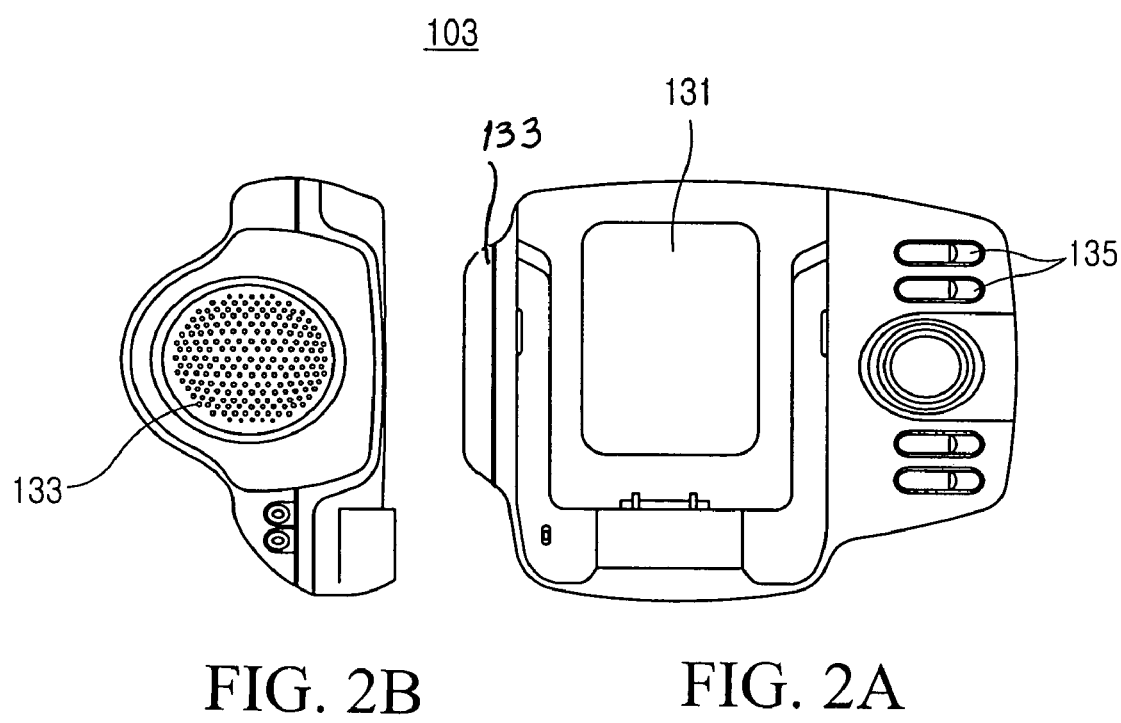
FIGS. 2a and 2b show a front view and a side view of a fastening part of the cradle, respectively, as shown in FIG. 1 according to the present invention.

Referring then to FIGS. 2a and 2b, which show a front view and a side view of the fastening unit 103 of the cradle as shown in FIG. 1, the fastening unit. 103 is configured to include a holder 131, a speaker set 133 and key buttons 135. The holder 131 is designed to provide a space sufficient to accommodate a portable terminal 20 (shown in FIG. 1), and it preferably may have at least one connector associated with the portable terminal. One side of the holder 131 is equipped with the speaker set 133 outputting voice messages which are related to various information provided through the user's navigation system. Further, the holder 131 has a set of key buttons 135 operated by the user for searching, selecting and/or outputting necessary information through his/her on-vehicle navigation system. The key buttons 135 are located on the front of the holder close to a side which is opposite to the speaker set 133. The fastening unit 103 is adapted for accommodation of the portable terminal 20 on it and includes therein a processing unit provided with software for operation of the navigation system.

Figure 4:
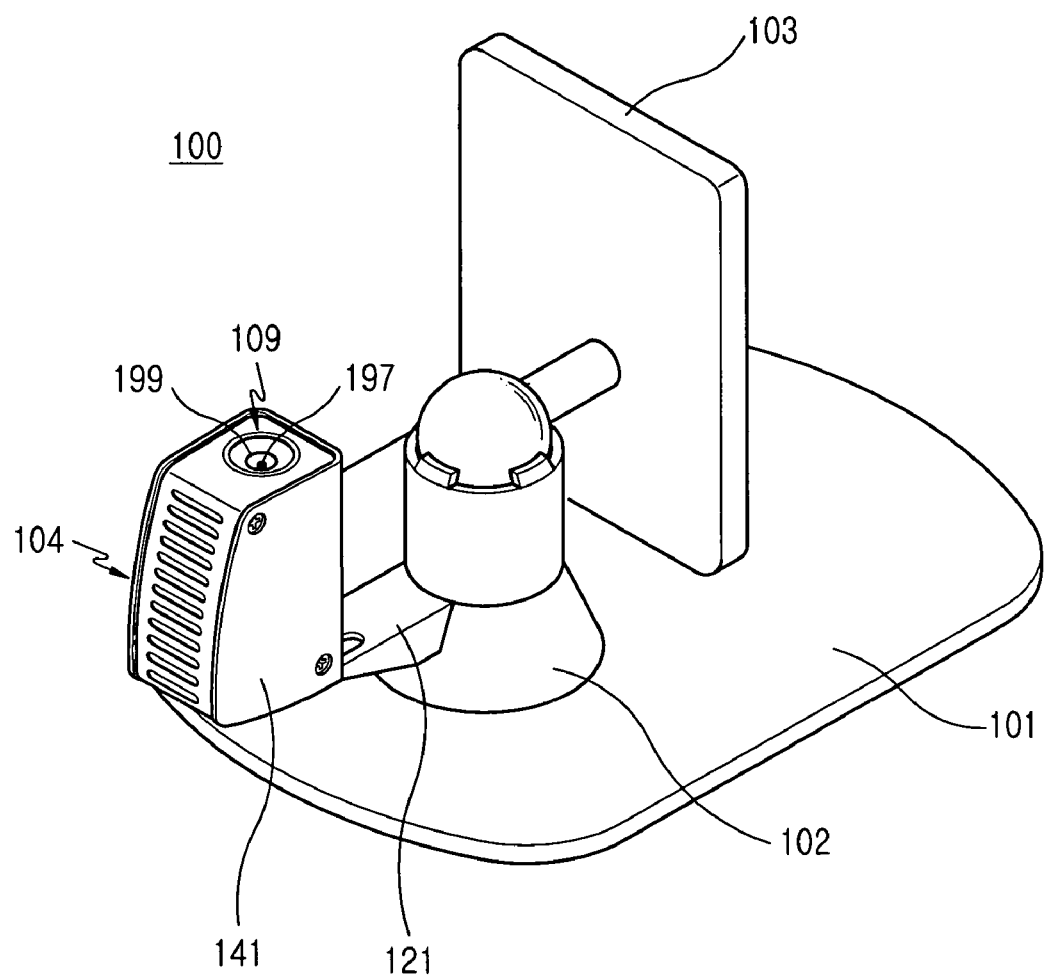
FIG. 4 schematically illustrates configuration of a sensor part of the cradle as shown in FIG. 1.
Figure 5:
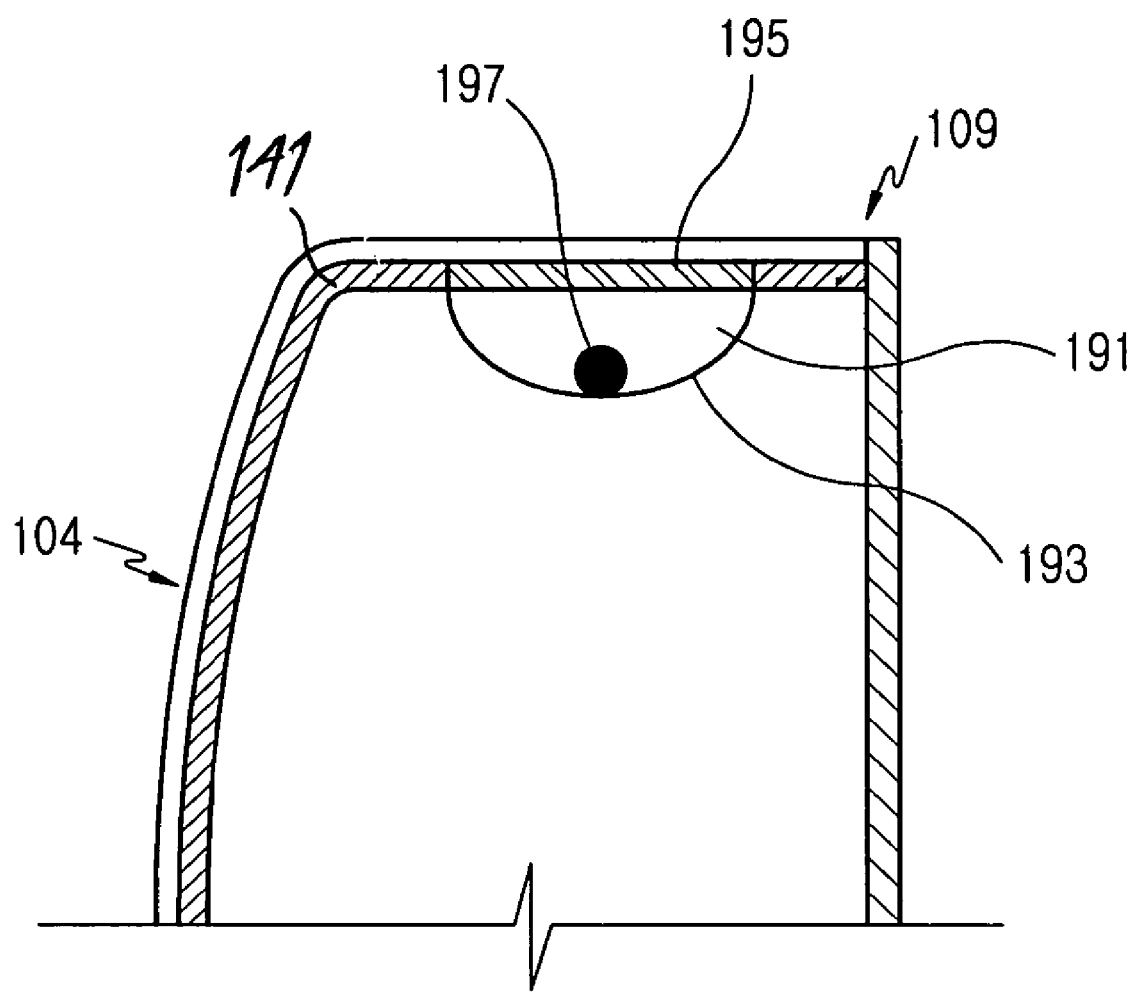
FIG. 5 shows a cross-sectional view of the sensor part of the cradle as shown in FIG. 1.
Figure 6:
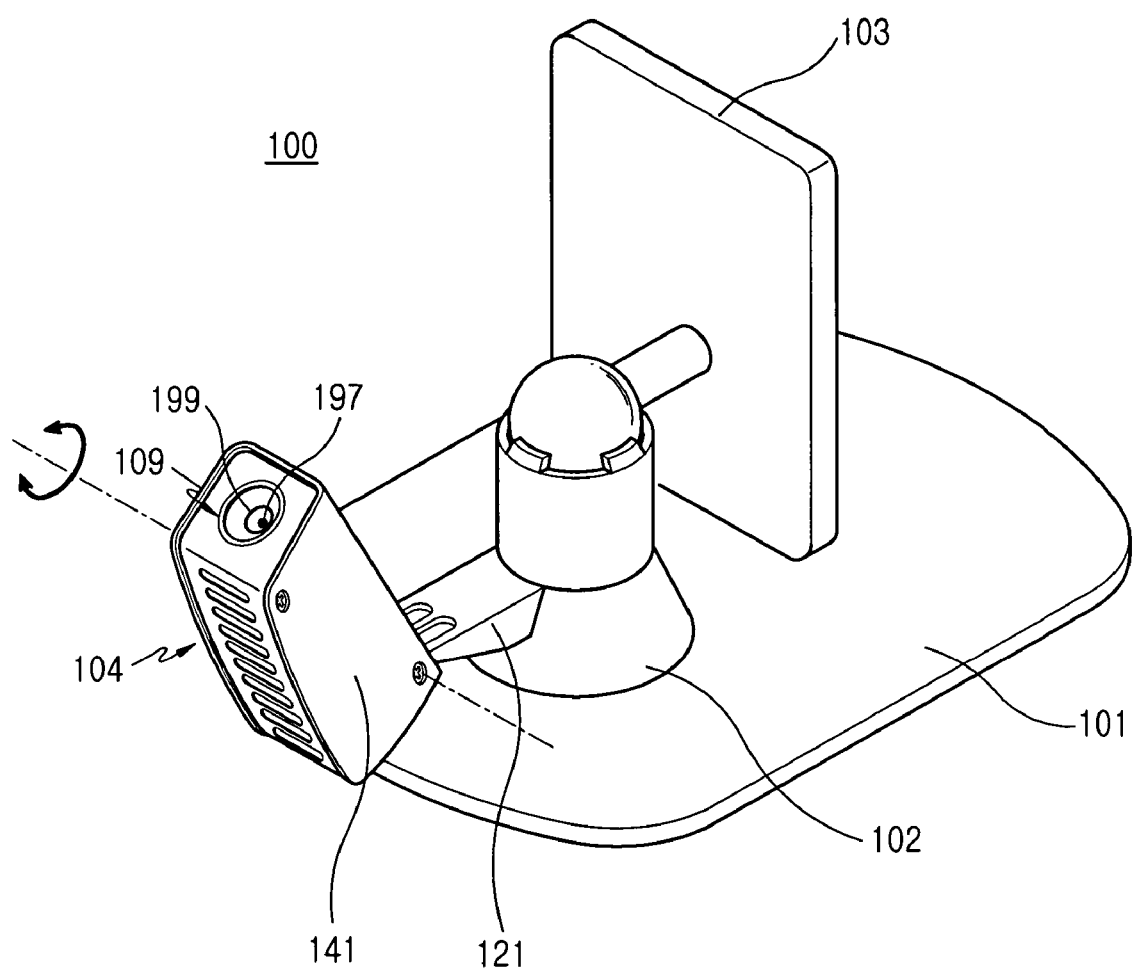
FIG. 6 schematically illustrates the rotational movement of the cradle as shown in FIG. 1 according to the preferred embodiment of the present invention.

Referring further to FIGS. 4 to 6, the sensor 104 is positioned to be rotatably connected to the supporting arm 121 extending from the support 102. The sensor 104 includes a housing 141 rotatably coupled to one end of the supporting arm 121 to accommodate a gyro-sensor, an acceleration sensor and any other directional sensors as required.

In the uppermost part of the housing 141 is disposed a level meter (or leveler) 109. (FIGS. 4, 5) for indicating the installed status of the sensor unit 104, which level meter is provided with an opening 191 (FIG. 5) formed in the uppermost surface of the housing 141, a ball 197 located in the opening 191, and a cover 195 for closing the opening 191. Preferably, the opening 191 is in the form of a hemisphere or curvature. The opening 191 is configured with a convex bottom having its center spaced downwards from the cover 195 at the greatest distance, as shown in FIG. 5. The ball 197 is movably accommodated inside the opening 191. It is preferable that the uppermost periphery of the opening 191 is tightly covered by the transparent cover 195. Since the depth of the opening 191 becomes deeper as it comes closer to its center, the ball 197 will be positioned in the center of the opening when the sensor 104 is kept along a vertical with respect to the ground surface. Therefore, the user would be able to check as to the position and installation status of the sensor 104 by viewing a position of the ball 197 within the opening 191. In the meantime, in order for the user to check as to the installation status of the sensor 104 more conveniently, a substantially circular limiting line 199 (FIG. 4) is defined in the bottom surface 193 of the opening 191 for indication of tolerance in movement of the ball 197. When the ball is positioned in the center of the annular limiting line 199 or its concentric circle, the user will determine that the position of the sensor 104 is in good order for precise operation.

Further, it should be appreciated that the user would be able to set the position of the sensor with more precision and convenience depending upon an area defined by the annular limiting line 199 on the bottommost surface 193 of the opening 191. That is to say, the closer the area in the annular limiting line 199 approaches the size of the ball, the more conveniently and precisely the user could make alignment of the ball in the concentric circles of the annular limiting line, thereby setting the most correct position of the sensor unit 104 during operation of the on-vehicle navigation system. However, if the limiting line 199 is set so narrow that the area within the limiting line is fully covered by the ball 197, then the position of the sensor unit 104 may be set rather incorrectly by the user. Accordingly, it will be apparent to a person skilled in the art that the area defined by the annular limiting line 199 within the opening 191 should be set adequately depending upon the size of the ball 197 and the opening 191. Additionally, it may be further provided with a cable for transferring electrical signals from a directional gyro-sensor and/or an acceleration sensor of the sensor 104 to various circuit devices equipped within the fastening unit 103 (FIG. 6).

Most preferably, the cradle 100 for the above navigation system is arranged on the dashboard 10 of the vehicle where a driver could view all the situations associated with the navigation system with more ease and convenience than any other places inside the vehicle. Upon fixing the cradle 100 onto the dashboard 10 of the vehicle, the user could actively fit the fixing unit 101 to a profile or contour of the dashboard because the fixing unit is formed of flexible or plastic material. In an example of the cradle according to the present invention, although the fixing unit 101 can be fixed onto the dashboard with ease, the angles of the cradle installed thereon will change slightly depending upon the profile of the dashboard 10, which in turn will make a change to the position and alignment status of the sensor 104. Hence, the driver will be able to make necessary adjustment to the position of the sensor and check its status of alignment through the leveler 109 for fixation of the sensor 104 in the correct navigational position perpendicular to the ground. As a result, utilizing the leveler 109 for making a proper adjustment of the sensor as required during its installation, the directional sensors such as the gyro-sensor, acceleration sensor and so on, constituting the sensor unit 104, will operate with more precision.

The cradle 100 for the on-vehicle navigation system according to the present invention is provided with the portable terminal 20 (FIG. 1) received by the holder 131, wherein the portable terminal is adapted to receive a variety of geographic or traffic information transmitted from a satellite or a base station and to deliver the received information to the driver via a processor unit and a set of operating system programs installed inside the fastening unit 103, outputting through the speaker set 133 (FIGS. 2*a* and 2*b*) or the display of the portable terminal 20. Similarly, various positional signals detected from the gyro-sensor and the acceleration sensor of the sensor unit 104 are also provided to the driver through the speaker set 133 or the display of the portable terminal via the fastening unit 103.

As understood from the foregoing description, the cradle for on-vehicle navigation system according to the present invention has a sensor unit equipped therein with directional sensors, so that a user could install such an on-vehicle navigation system in any desired position inside the vehicle with ease and convenience. Moreover, owing to the leveler 109 (FIG. 4) provided in the sensor unit 104 for visually monitoring the position and alignment status of the sensor, it would be very easy for its user to install such an for on-vehicle navigation system in any desired position and to keep those directional sensors operate precisely.

While the preferred embodiments of the present invention have been illustrated and described, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention; instead, it is intended that the present invention include all embodiments falling within the scope of the appended claims.

What is claimed is:

1. A cradle for an on-vehicle navigation system using a portable terminal, comprising:

a fixing unit for fixing the on-vehicle navigation system onto a desired surface inside a vehicle;

a support extending upwardly from the fixing unit;

a fastening unit configured to receive the portable terminal and rotatably positioned on the support; and a sensor unit rotatably coupled to the support, the sensor unit being provided with a leveler in an uppermost end of the sensor unit.

2. The cradle for an on-vehicle navigation system according to claim 1, wherein the fastening unit comprises a holder adapted for accommodation of the portable terminal, a speaker set installed on the holder, and at least one key button arranged on the holder and spaced from the speaker set.

3. The cradle for an on-vehicle navigation system according to claim 1, wherein the sensor unit is configured to accommodate a gyro-sensor and an acceleration sensor therein.

4. The cradle for an on-vehicle navigation system according to claim 1, wherein the sensor unit comprises a housing having an opening in the uppermost end, the opening having a shape of hemisphere and provided with a bottom central area; a ball movably accommodated within the opening; and a cover made of a transparent material and adapted to completely close an uppermost surface of the opening, the bottom central area being located at a largest depth from the transparent cover.

5. The cradle for an on-vehicle navigation system according to claim 4, wherein an annular limiting line is formed on the bottom central area of the opening for defining a permissible limit in movement of the ball within the bottom central area, wherein the ball moving within the permissible level is located substantially along a vertical with respect to a ground.

6. The cradle for an on-vehicle navigation system according to claim 1, wherein the fixing unit is secured onto a dashboard inside the vehicle.

7. The cradle for an on-vehicle navigation system according to claim 1, wherein the fixing unit has a given area of a plate shape.

* * * * *